United States Patent [19]

Lee et al.

[11] Patent Number: 5,973,877
[45] Date of Patent: Oct. 26, 1999

[54] PORTABLE AUDIO LOGIC DECK MECHANISM AND PINCH ROLLER DRIVING APPARATUS AND EJECTING APPARATUS ADOPTED IN THE SAME

[75] Inventors: Chang-jip Lee; Tae-won Park, both of Suwon, Rep. of Korea

[73] Assignee: Samsung Electronics Co., Inc., Suwon, Rep. of Korea

[21] Appl. No.: 08/918,389

[22] Filed: Aug. 26, 1997

[30] Foreign Application Priority Data

Aug. 27, 1996 [KR] Rep. of Korea ...................... 96-35903
Oct. 16, 1996 [KR] Rep. of Korea ...................... 96-46349
Oct. 30, 1996 [KR] Rep. of Korea ...................... 96-50499
Oct. 30, 1996 [KR] Rep. of Korea ...................... 96-50500

[51] Int. Cl.$^6$ .................................................. G11B 15/26
[52] U.S. Cl. ............................................. 360/95; 360/137
[58] Field of Search ................................ 360/85, 95, 137

[56] References Cited

U.S. PATENT DOCUMENTS

| | | | |
|---|---|---|---|
| 5,218,492 | 6/1993 | Miyamoto et al. | 360/85 |
| 5,260,844 | 11/1993 | Koga et al. | 360/137 X |
| 5,691,858 | 11/1997 | Lee et al. | 360/85 |
| 5,764,433 | 6/1998 | Hanzawa et al. | 360/96.6 |

*Primary Examiner*—William R. Korzuch
*Attorney, Agent, or Firm*—Dilworth & Barrese

[57] ABSTRACT

A portable audio logic deck mechanism with a single driving source includes a power transfer unit transmitting power from the driving source, an interlocking unit selectively transmitting power to a pair of reel tables, a recording/reproducing unit performing recording/reproduction on a tape on reel tables, a first mode converting unit converting the rotational speed and direction of reel tables, a second mode converting unit moving the recording/reproducing unit up or down by interlocking with the first mode converting unit, and an ejecting unit to open/close a door. A pinch roller driving apparatus for a portable audio logic deck to adjust a tape running speed includes a pair of guide brackets, a pair of pinch rollers selectively close-contacting the respective rotation shafts of capstan wheels, and a pinch lever which selectively presses the guide brackets to pivot the pinch rollers by pivoting selectively in contact with both ends of the upper protruding portion according to the position of a head slide. An ejecting apparatus for the portable audio logic deck includes a knob having a lock member of which one end is hooked by the door, an ejection lever of which one end is coupled with the knob and having a first stopper, a head lever having a hooking protrusion fitting to a cam groove of a cam gear and a second stopper to selectively face the first stopper and guide the up/down movements of the magnetic head by interlocking with the rotation of the cam gear.

6 Claims, 8 Drawing Sheets

PORTABLE AUDIO LOGIC DECK MECHANISM AND PINCH ROLLER DRIVING APPARATUS AND EJECTING APPARATUS ADOPTED IN THE SAME

BACKGROUND OF THE INVENTION

1. Field of the Invention

The present invention relates to a portable audio logic deck mechanism, and a pinch roller driving apparatus and an ejecting apparatus adopted therein, which are operated by a single driving source, and more particularly, to a portable audio logic deck mechanism, and a pinch roller driving apparatus and an ejecting apparatus adopted therein, having an improved structure in which loads applied to a main slider during a power conversion and a mode conversion are reduced.

2. Description of the Related Art

A typical portable audio deck mechanism is operated either manually or automatically. The portable audio deck employs a cassette tape as a recording medium to record/reproduce information, and a head operation, a tape running driving, and a mode conversion are performed by a single driving motor.

As shown in FIGS. 1 and 2, a conventional portable audio logic deck apparatus comprises a driving source 20, which is fixedly installed at a main base 10 formed of a single motor, a power transfer unit 30 for transferring power generated from the driving source 20, a pair of reel tables 40 on which reels (not shown) of a cassette tape are placed, an interlocking unit 50 for transferring the power to a selected reel table of the pair of reel tables 40 by being engaged with the power transfer unit 30, a magnetic head 60 for performing magnetic recording/reproducing, a mode converting unit 70 for moving up/down of the magnetic head 60 and converting rotational speed and direction of the pair of reel tables 40, and an ejecting unit 80 for loading/unloading the tape.

The power transfer unit 30 comprises a pair of capstan wheels 33 and 34 rotating around a capstan axis (not shown), a main gear 35 rotating interlockingly with one capstan wheel 34, and a belt 31 for linking the driving source 20, a pulley 32 and the capstan wheels 33 and 34. The belt 31 is wound in an anti-rolling position via the pulley 32 to allow the capstan wheels 33 and 34 to rotate in opposing directions from each other. The capstan wheels 33 and 34, respectively, have rotation shafts 36 and 37 which extend to the rear side of the main base 10. Thus, the rotational force of the driving source 20 is delivered to the main gear 35 by the power transfer unit 30.

The interlocking unit 50 includes a plurality of gears and appropriately drives the reel table 40 with the rotational force transferred through the main gear 35 in a forward/reverse-direction play mode or a fast winding mode.

The mode converting unit 70 includes a cam gear 71 having a cam groove 71a and selectively rotates by being interlocked with the main gear 35, and a main slide 73 having a hooking protrusion 73a to be inserted into the cam groove 71a and moves linearly by the rotation of the cam gear 71. The main slide 73 receives an elastic force by an elastic spring 75 toward a position in a stop mode and is converted into an operation mode by moving linearly according to the rotation of the cam gear 71.

The magnetic head 60 is supported by and installed at a head slide 61 and moves up/down by being interlocked with the main slide 73.

The ejecting unit 80 is comprised of a knob 81 for opening/closing a door (not shown), an ejecting slide 83 and levers 85 and 87. Thus, in the stop mode, the door is open by operating the knob 81. In an operation mode, the door is prevented from opening since the one lever 87 is hooked by a stopper 74 which is installed at the main slide 73. Also, a step portion 83a is formed at one end of the ejecting slide 83 to selectively catch the head slide 61, thereby enabling performance of an automatic music sensor (AMS).

As described above, in the conventional portable audio logic deck apparatus having the above structure, since mode conversion, rotation of the pinch roller, and up or down movement of the magnetic head 60 are performed by being interlocked with the movements of the main slide 73, an overload is applied to the cam gear 71 which moves the main slide 73 linearly.

Also, in the ejecting unit 80, since the eject slide 83 and levers 85 and 87 are additionally required to move the magnetic head 60 up or down while being interlocked with the movements of the main slide 73, and the function of preventing the opening of the door in a play mode and the AMS function are separately operated, the structure thereof is complicated and the man-hours required for assembly and the number of parts increase.

SUMMARY OF THE INVENTION

To overcome the above problems, it is an objective of the present invention to provide a portable audio logic deck mechanism in which a magnetic head is moved up or down by a cam gear different from the cam gear that operates a main slide so that the load to the main slide can be reduced.

It is another objective of the present invention to provide a pinch roller pressing apparatus for a portable audio logic deck having a simplified structure in which a pinch roller is selectively pressed to a rotation shaft of a capstan wheel by sliding a protruding portion integrally formed with the main slide.

It is still another objective of the present invention to provide an ejecting apparatus for a portable audio logic deck having a simplified structure so that the magnetic head is moved up or down using a lever which is installed to be capable of pivoting by the cam gear and that the operation is stopped in an operation mode and a door can be opened and closed in a stop mode.

Accordingly, in accordance with an objective of the present invention, there is provided a portable audio logic deck mechanism comprising: a main base; a single driving source installed at the main base; a power transfer unit which transmits power from the driving source; a pair of reel tables installed at predetermined positions on the main base to accommodate a supply reel and a take-up reel of a tape; an interlocking unit which transmits power by selecting one of the reel tables to be interlocked with the power transfer unit; a recording/reproducing unit which performs recording and/or reproducing on the tape placed on the reel tables according to a selection mode; a first mode converting unit which converts the rotational speed and direction of the reel table; a second mode converting unit which moves the recording/reproducing unit up or down by interlocking with the first mode converting unit; and an ejecting unit which is installed at the main base to open or close a door.

In accordance with another objective, there is provided a pinch roller driving apparatus for a portable audio logic deck which selectively close-contacts rotation shafts of a pair of capstan wheels while interlocking with a main slide which converts an operation mode so that the running speed of a tape can be controlled, the pinch roller driving apparatus comprising: a pair of guide brackets pivotably installed at the main base; a pair of pinch rollers installed at the respective guide brackets and selectively close-contacting the respective rotation shafts of the capstan wheels; an upper protruding portion formed to protrude and become integral with the main slide and having both ends of an upper portion thereof formed at an angle; a pinch lever which selectively presses the guide brackets to pivot the pinch rollers by pivoting selectively in contact with both ends of the upper protruding portion according to the position of a head slide which is installed at the main base to be capable of moving up or down.

In accordance with yet another objective of the present invention, there is provided an ejecting apparatus for a portable audio logic deck which is installed at a main slide for moving a magnetic head up or down, opening/closing a door and performing an automation music sensor function, the ejecting unit comprising: an opening/closing knob which is installed at the main base to be capable of sliding and having a lock member of which one end is hooked by the door; an ejection lever pivotably installed at the main base and of which one end is coupled with the opening/closing knob, and having a first stopper formed to be protruding at one portion thereof; a head lever having a hooking protrusion which inserts into a cam groove of a cam gear and a second stopper formed to protrude to selectively face the first stopper and guide the up and down movement of a magnetic head by interlocking with the rotation of the cam gear.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1:
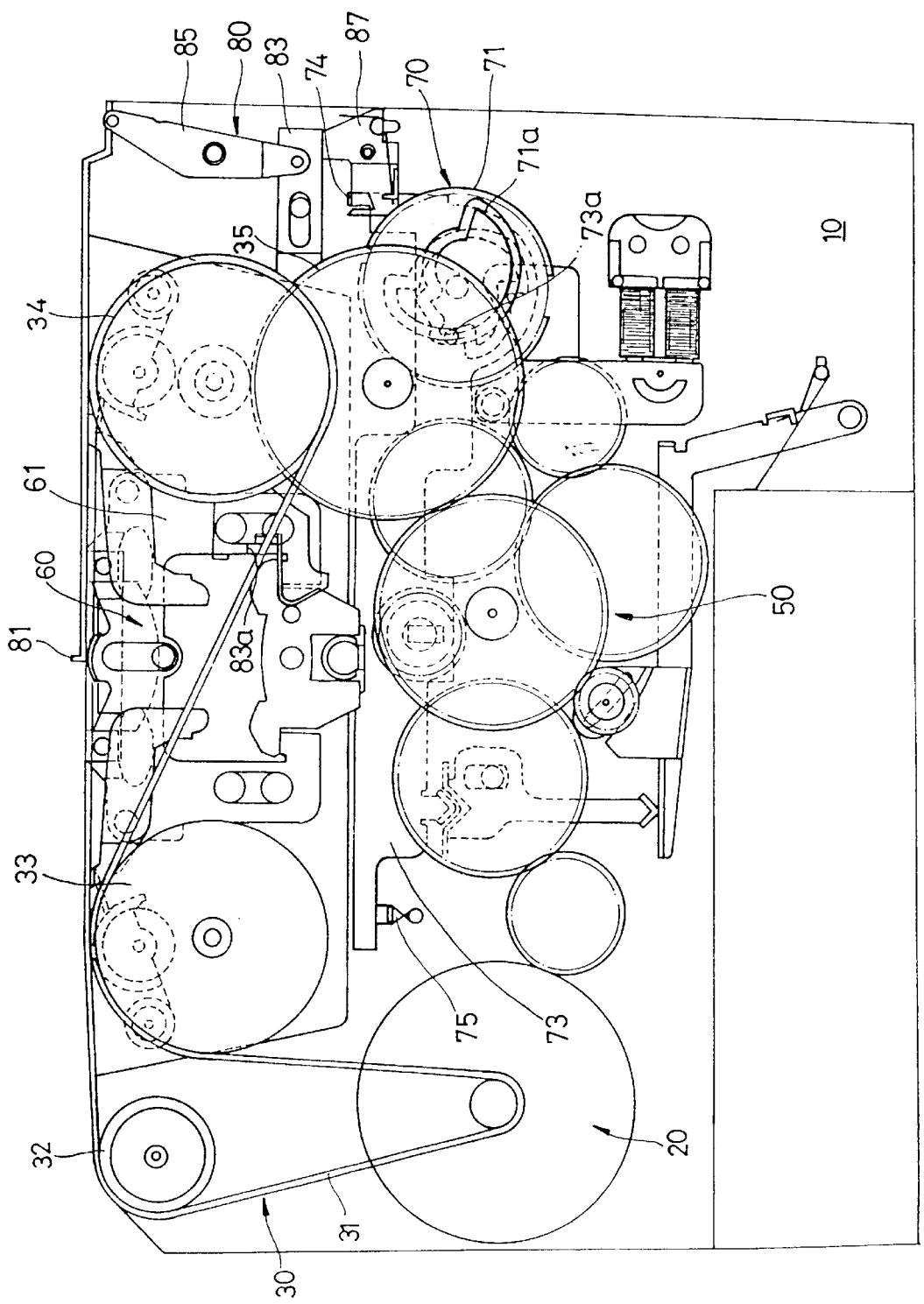
FIG. 1 is a plan view illustrating the mechanism of a conventional portable audio logic deck.
Figure 2:
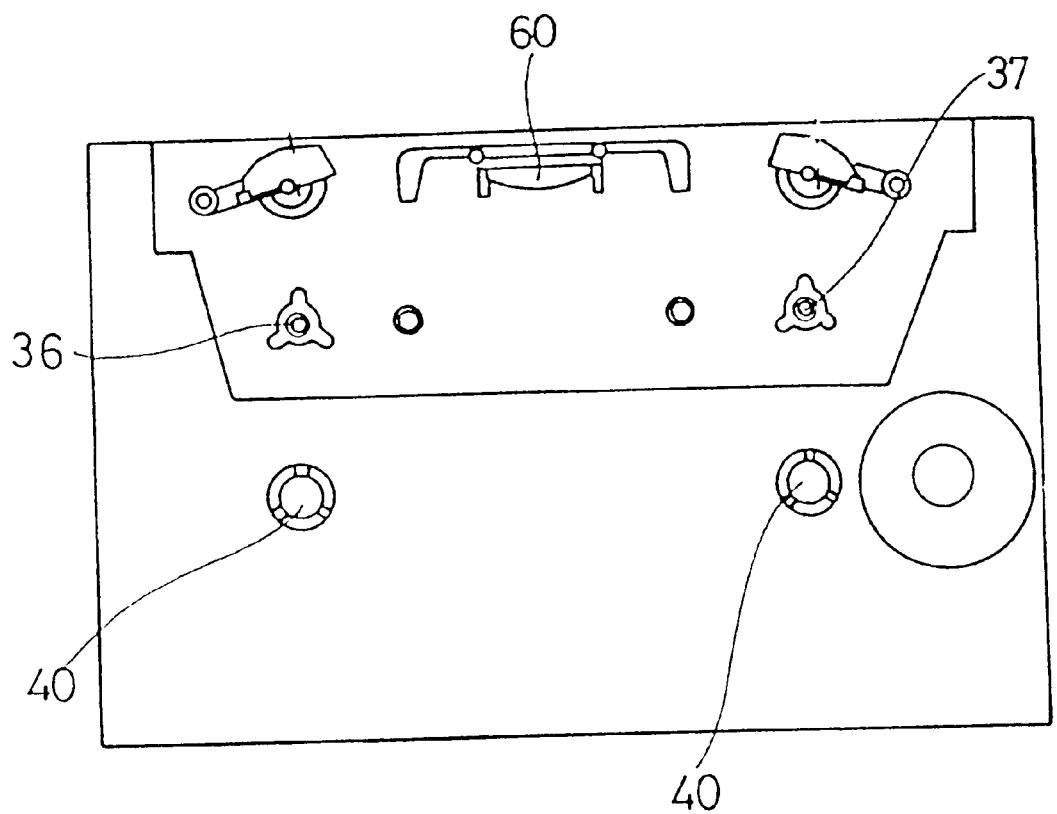
FIG. 2 is a bottom view of the mechanism shown in FIG. 1.
Figure 3:
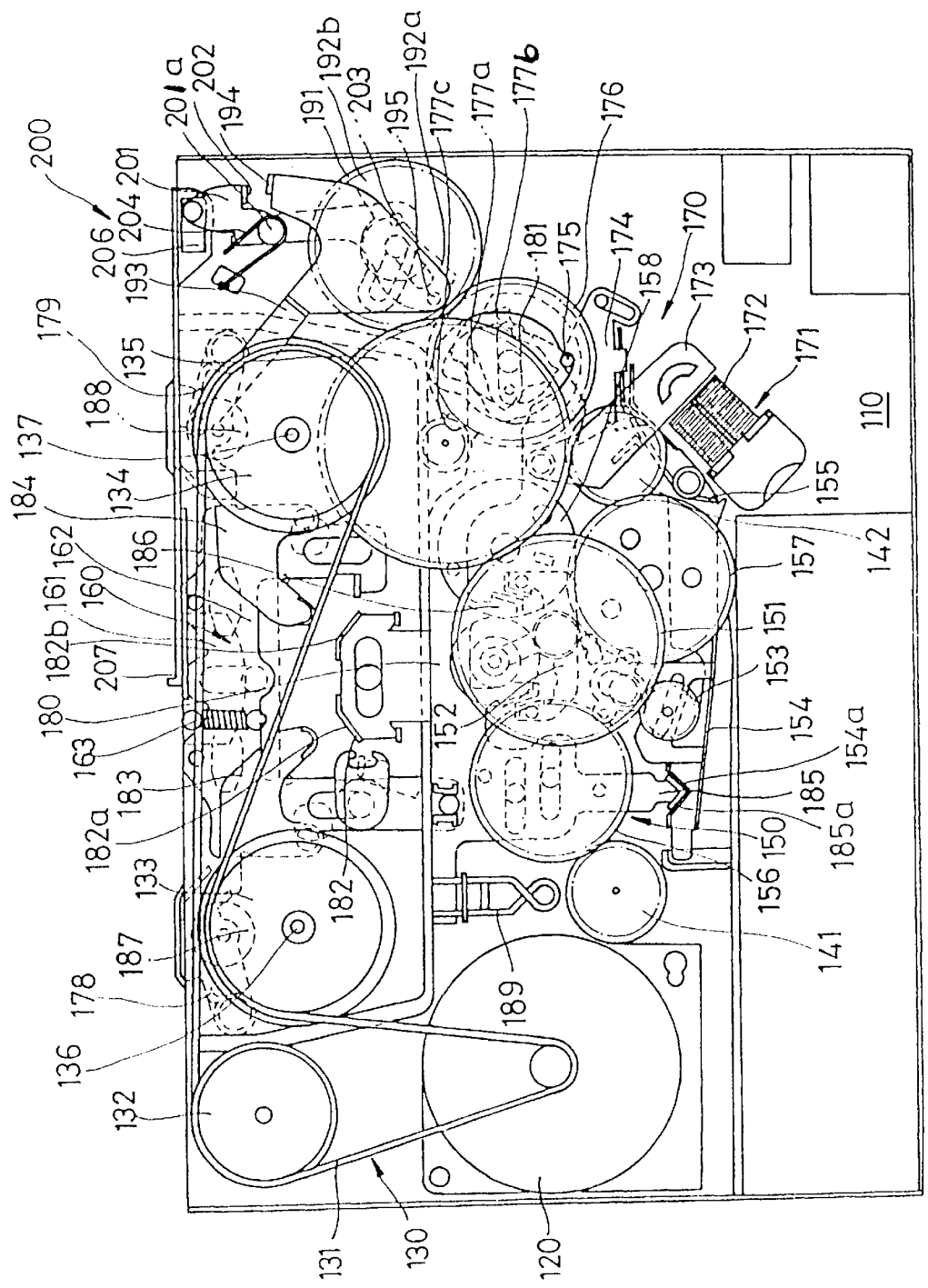
FIG. 3 is a plan view illustrating the mechanism of a portable audio logic deck in a stop mode according to a preferred embodiment of the present invention.
Figure 4:
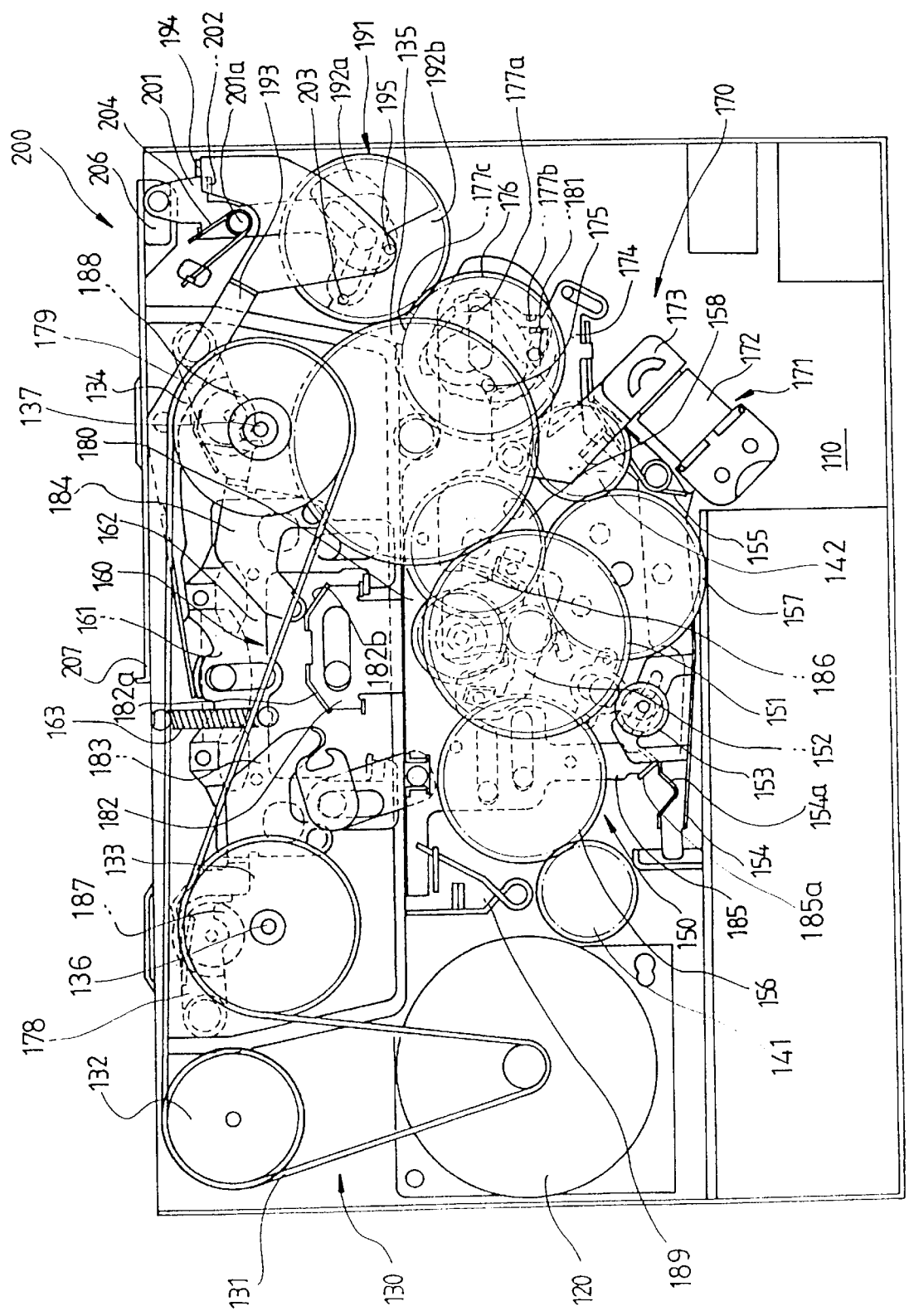
FIG. 4 is a plan view illustrating the mechanism of a portable audio logic deck in a forward play mode according to a preferred embodiment of the present invention.
Figure 5:
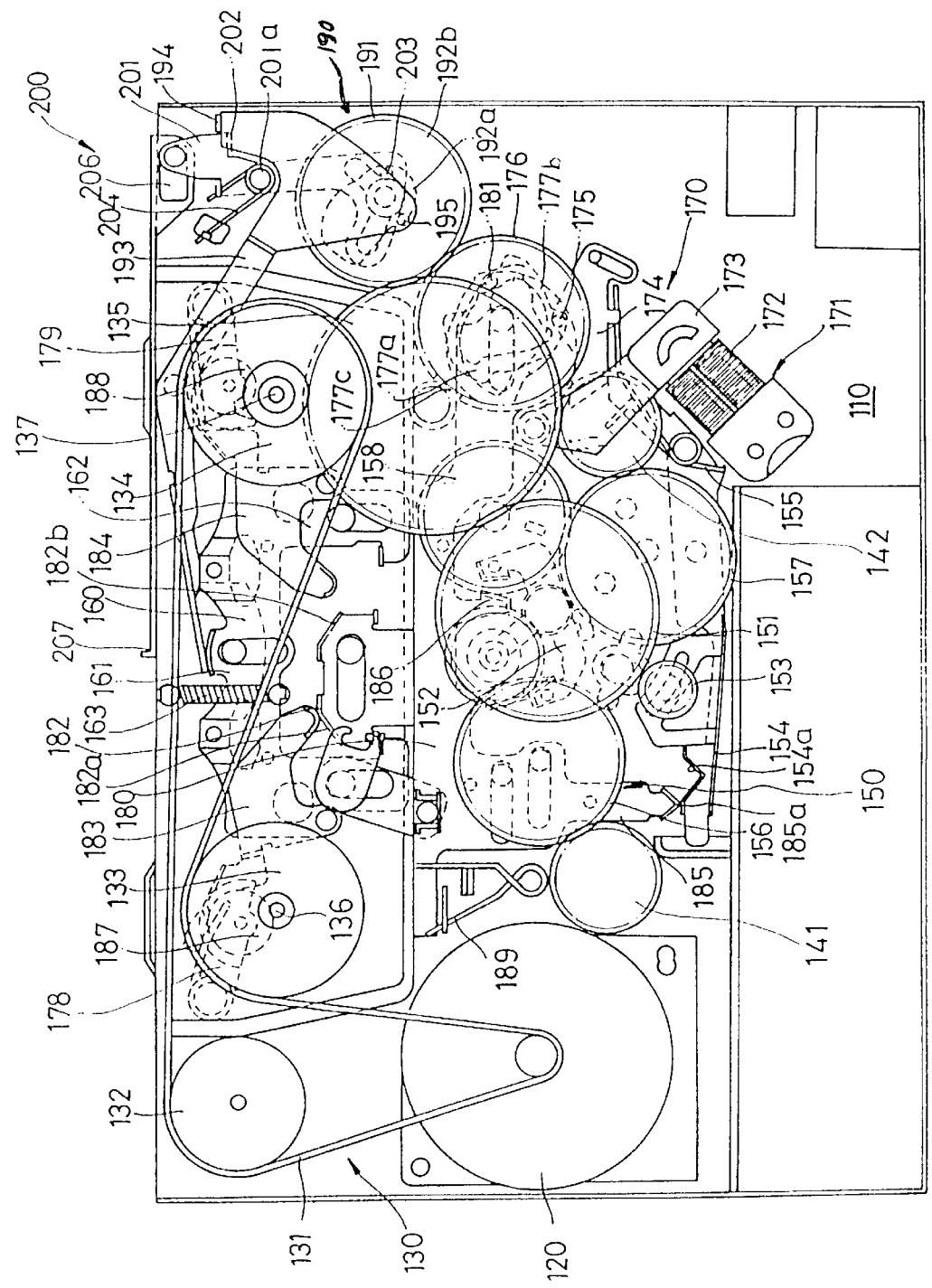
FIG. 5 is a plan view illustrating the mechanism of a portable audio logic deck in a reverse play mode according to a preferred embodiment of the present invention.

Referring to FIGS. 3, 4 and 5, a portable audio logic deck mechanism of the present invention includes a main base 110, a driving source 120 fixedly installed to the main base 110, a power transfer unit 130 for transferring power generated from the driving source 120, a pair of reel tables 40 (see FIG. 2) on which a supply reel and a take-up reel of a cassette tape (not shown) are respectively placed, an interlocking unit 150 for selectively transferring power to any one of the reel tables (40 of FIG. 2) while being interlocked with the power transfer unit 130, a recording/reproducing unit 160 for performing magnetic recording/reproduction, a first mode converting unit 170 for converting the rotational speed and direction of the reel tables, a second mode converting unit 190 for moving the recording/reproducing unit 160 up or down by being interlocked with the first mode converting unit 170, and an ejecting unit 200 for loading/unloading the tape.

The driving source 120 is formed of a single motor, and the pair of reel tables (40 of FIG. 2) are selectively rotated by forward/reverse rotation of the single motor and the recording/reproducing unit 160 is driven. The rotational speed of the reel table is determined by the power transfer ratio of the interlocking unit 150.

The power transfer unit 130 is a member which transfers the power generated from the driving source 120 to the interlocking unit 150 and the first mode converting unit 170. The power transfer unit 130 is comprised of a pulley 132, a pair of capstan wheels 133 and 134 arranged a predetermined distance apart from each other, a belt 131 for conveying the power supplied from the driving source 120 to the capstan wheels 133 and 134, and a main gear 135 rotating being meshed with gear teeth (not shown) of the capstan wheel 134. The belt 131 is wound in an anti-rolling position via the pulley 132 to rotate the capstan wheels 133 and 134 in opposite directions. The capstan wheels 133 and 134, respectively, have rotation shafts 136 and 137 which protrude to the rear side of the main base 110, and the rotation shafts 136 and 137 deliver a rotational force to the pinch rollers 187 and 188 while facing the pinch rollers 187 and 188. The tape of the cassette tape placed on the main base 110 passes between the pinch rollers 187 and 188 and the rotation shafts 136 and 137 of the capstan wheels 133 and 134 so that the tape runs at a constant speed in a play mode and in a recording mode in a forward/reverse direction. The main gear 135 is rotated by a rotational force of the capstan wheel 134, and the rotational force is transferred to the interlocking unit 150 and the first mode converting unit 170.

The interlocking unit 150 is comprised of a clutch gear 151 movably installed on the main base 110 and interlocked with the main gear 135, an idle gear 153 for selectively transferring the rotational force to each of a pair of play gears 141 and 142 while pivoting by being interlocked with the clutch gear 151, and a pair of intermediate gears 156 and 157 for transferring a rotational force according to each mode while being interlocked with each of the play gears 141 and 142 and selectively interlocked with the clutch gear 151 and the idle gear 153. The clutch gear 151 is fixedly installed to a first lever 152, and the first lever 152 pivots according to the operation of the first mode converting unit 170. Accordingly, the clutch gear 151 selectively interlocks with the idle gear 153 and the intermediate gears 156 and 157. Here, a relay gear 158 is arranged between the clutch gear 151 and the intermediate gear 157 in consideration of the arrangement of the above-mentioned gears. The idle gear 153 is fixed to a second lever which is moveably installed on the main base 110 and selectively interlocks with the clutch gear 151 according to the mode.

That is, in a play mode, referring to FIGS. 4 and 5, the clutch gear 151 interlocks with intermediate gear 156 by a pivot of the first lever 152. However, in a fast forward winding mode, the clutch gear 151 interlocks with the idle gear 153 by a pivot of the second lever 154.

The recording/reproducing unit 160 is comprised of a head slide 162 installed at the main slide 110 configured to be capable of moving up or down, a magnetic head 161 which is fixed to the head slide 162 and selectively contacts the tape placed on the reel table (40 of FIG. 2), and a head elastic member 163 which allows the head slide 162 to receive a force in one direction. The magnetic head 160 and the head slide 162 are moved up or down by the second mode converting unit 190.

The first mode converting unit 170 includes a motive generator 171, a first cam gear 176 which pivots finely by the motive generator 171 and selectively interlocks with the power transfer unit 130, a main slide 180 which moves linearly and interlockingly with the first cam gear 176, a pair of guide brackets 178 and 179 installed at the main base 110 to be capable of pivoting, a pair of pinch rollers 187 and 188 pivotably installed at each of the guide brackets 178 and 179 and for controlling the rotational speed of the tape by being selectively interlocked with the rotation shafts 136 and 137 of the capstan wheels 133 and 134, and a pinch roller driving apparatus for selectively pivoting the guide brackets 178 and 179 by being interlocked with the movement of the main slide 180.

The motive generator 171 includes an arm 173, an electromagnet 172 which drives the arm 173 linearly by an applied current, and a link member 174 pivotably installed at the main base 110 and having a first guide protrusion 175, one end of which is fixed to the arm 173 and the other end inserted into a first cam groove 177b of the first cam gear 176. Thus, the link member 174 pivots by linearly driving the arm 173 and accordingly the first cam gear 176 pivots finely.

The first cam gear 176 is not threaded at a portion of the outer circumference 177c thereof to selectively interlock with the main gear 135. Thus, in a stop mode, a fast forward/reverse rotation mode and a play mode, the rotational force of the main gear 135 is not transferred to the first cam gear 176. Whereas, in a conversion of a mode, the first cam gear 176 is finely rotated by the driving of the motive generator 171 and interlocks with the main gear 135. Accordingly, the rotational force of the main gear 135 is transferred to the first cam gear 176. The first cam grooves 177a and 177b form a closed loop around the rotation shaft. A second guide protrusion 181 of the main slide 180 is inserted into one cam groove 177a and the first guide protrusion 175 is inserted into the other cam groove 177b.

The main slide 180 which slides by the rotation of the first cam gear 176 guides the pinch rollers 187 and 188 to closely contact the capstan wheels 133 and 134 and allows the idle gear 153 to interlock with or release from the clutch gear 151. For that purpose, an auxiliary slide 185, a lower protruding portion 186 and an upper protruding portion 182 which is a portion of the pinch roller driving apparatus are formed on the main slide 180.

Figure 6:
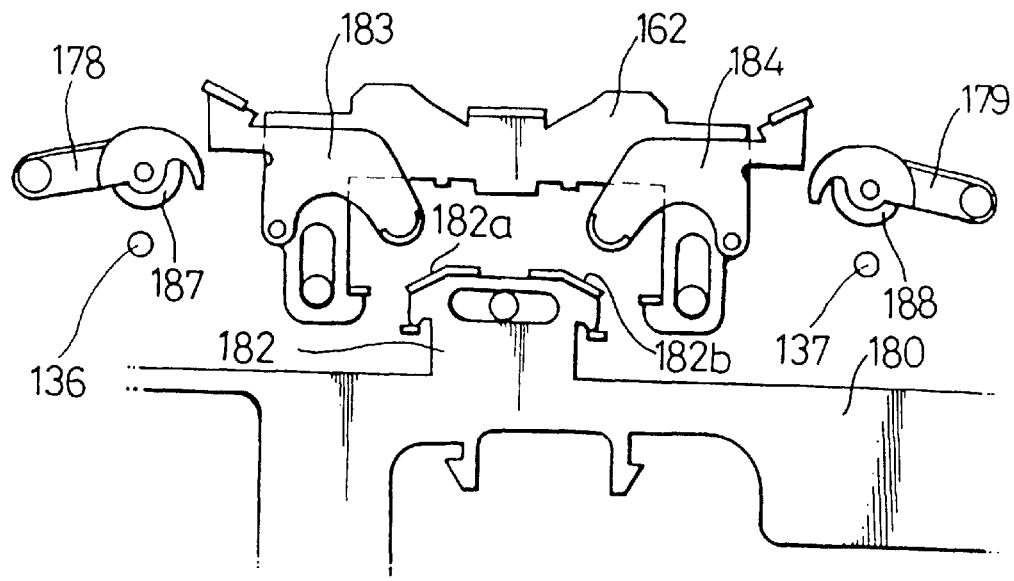
FIG. 6 is a plan view schematically illustrating a pinch roller driving apparatus for a portable audio logic deck in a stop mode according to a preferred embodiment of the present invention.
Figure 7:
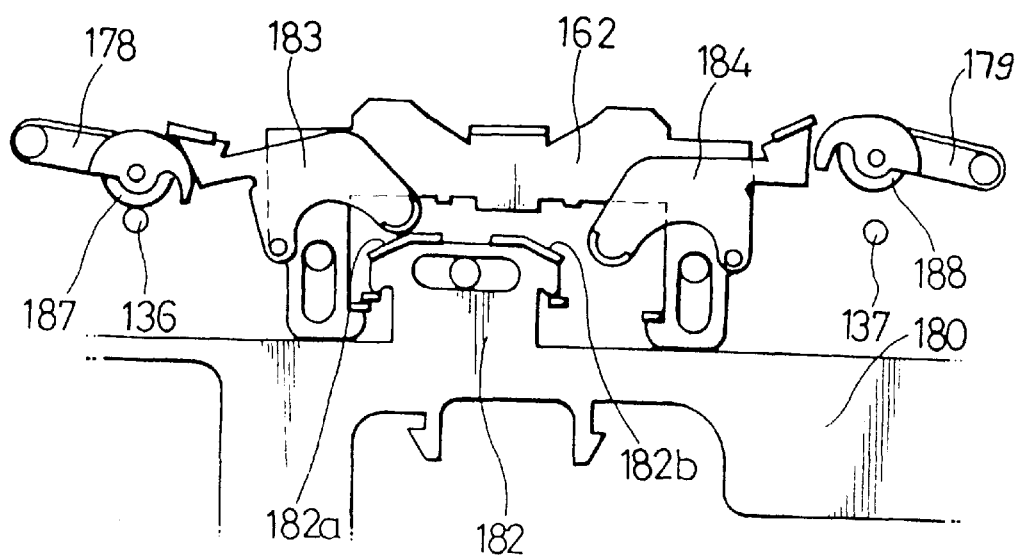
FIG. 7 is a plan view schematically illustrating the pinch roller driving apparatus for a portable audio logic deck in a play mode according to a preferred embodiment of the present invention.

Referring to FIGS. 6 and 7, the pinch roller driving apparatus includes the upper protruding portion 182 having both ends 182a and 182b of the upper portion thereof formed at an inclined angle, and a pair of pinch levers 183 and 184 pivotably installed at a predetermined position of the head slide 162. The pinch levers 183 and 184 each pivot while selectively contacting both ends of the upper protruding portion 182 according to the positions of the magnetic head 161 and the main slide 180 to selectively press the guide brackets 178 and 179 to pivot the pinch rollers 187 and 188.

In a stop mode, referring to FIG. 6, since the head slide 162 is disposed to not be pressed, the pinch levers 183 and 184 pivotably installed on the head slide 162 are spaced from the upper protruding portion 182. Thus, since each end portion of the pinch rollers 183 and 184 does not press the guide brackets 178 and 179, each of the pinch rollers 187 and 188 is disposed spaced from the rotation shafts 136 and 137 of the capstan wheels 133 and 134 (see FIG. 3).

In a play mode, referring to FIG. 7, the head slide 162 descends toward the main slide 180 by being pressed by the ejecting unit 200. Also, as the main slide 180 slides in one direction, the upper protruding portion 182 is moved. Accordingly, an end portion of the pinch lever 183 pivots while in contact with the angled end 182a of the upper protruding portion 182. Accordingly, an end of the pinch lever 182 presses the guide bracket 178 so that the pinch roller 187 can closely contact the rotation shaft 136 of the capstan wheel. As a result, the running speed of the tape (not shown) passing between the pinch roller 187 and the rotation shaft 136 can be maintained at a constant speed.

The auxiliary slide 185 pivots the second lever 154 located thereunder. To do so, the auxiliary slide 185 has an inclined end portion 185a and the second lever 154 has a guide groove 154a formed with an indentation such that the inclined end portion 185a of the auxiliary slide 185 inserts therein. Thus, when the auxiliary slide 185 pivots to the left and right, the second lever 154 pivots according to the movement of the inclined end portion 185a of the auxiliary slide 185. The second lever 154 receives a force in one direction by a second elastic member 155 such that the idle gear 153 interlocks with the clutch gear 151 when the pressing of the auxiliary slide 185 is removed. The lower protruding portion 186 pivots the first lever 152. That is, the first lever 152 which is pivotably coupled to the main base 110 pivots to the left and right by being engaged with the linear transfer of the main slide 180 while a portion of the first lever 152 is in contact with the lower protruding portion 186. Also, the main slide 180 includes a first elastic member 189 coupled to one end thereof and receives a force toward the center of the main slide 180 when moving to the left and right, e.g., toward the position in a stop mode.

The second mode converting unit 190 includes a second cam gear 191 rotating interlockingly with the first cam gear 176, and a head lever 193 of which the rotational center is fixed to the main base 110 and for moving the magnetic head 160 up or down by being interlocked with the second cam gear 191.

The second cam gear 191 has a pair of second cam grooves 192a and 192b into which a hooking protrusion 195 of the head lever 193 and a hooking protrusion 203 of the ejecting unit 200 are inserted respectively. Since the second cam grooves 192a and 192b each form a closed loop of a predetermined shape, the head lever 193 pivots around the rotation shaft thereof during the rotation of the second cam gear 191. One end of the head lever 193, by interlocking with the rotation of the second cam gear 191, selectively presses the head slide 193, and a first stopper 194 is formed at the other end thereof to locate the magnetic head 160 at a position for AMS.

Referring to FIGS. 3 through 5, 8 and 9, the ejecting unit 200 includes an opening/closing knob 207 disposed outside the main base 110, an ejection lever 201 of which the hooking protrusion 203 is inserted into the second cam groove 192b, and a third elastic member 204 to allow the ejection lever 201 to receive a force in one direction. One end of the ejection lever 201 inserts into a slot 206 of the opening/closing knob 207 and a second stopper 202 is formed at a predetermined position thereon to allow the first stopper 194 to be hooked. The opening/closing knob 207 is installed at the main base 110 to pivot the ejection lever 201 during a linear movement thereof so that the head slide 162 is moved up or down. The ejection lever 201 is installed at the main base 110 to be capable of pivoting around a pivoting shaft 201a by interlocking with the opening/closing knob 207 and selectively prevents the operation of the opening/closing knob 207 according to a selected mode.

The operation of the ejecting unit 200 having the above structure will now be described in detail according to a stop mode, a play mode and a fast rotation mode.

In a stop mode, as shown in FIG. 6, according to the rotation position of the second cam gear 191, a portion of the head lever 193 contacting the head slide 162 rises, and the first stopper 194 is lowered. Thus, since the first stopper 194 does not contact the second stopper 202, the ejection lever 201 pivots freely by being engaged with the sliding of the opening/closing knob 207. Thus, the door (not shown) can be opened/closed freely.

In a play mode, as shown in FIG. 7, the hooking protrusion 195 is transferred along the second cam groove 192a by the rotation of the second cam gear 191 so that the portion of the head lever 193 contacting the head slide 162 is lowered and the first stopper 194 rises to be disposed on the second stopper 202. Thus, when the opening/closing knob 207 slides, the second stopper 202 rises a minute distance to contact the first stopper 194. Accordingly, pivoting of the ejection lever 201 and sliding of the opening/closing knob 207 are restricted to thereby prevent opening of the door (not shown).

In a fast rotation mode, the head lever 193 is arranged similarly as shown in FIG. 7 so that the movement areas of the ejection lever 201 and the opening/closing knob 207 are restricted. The head lever member 193 partially pivots and performs an AMS function while the magnetic head 161 contacts half of the running tape.

As shown in FIGS. 3 through 5, the pinch roller driving apparatus adopted in a portable audio logic deck according to a preferred embodiment of the present invention can control the running speed of the tape by selectively close-contacting the rotation shafts 136 and 137 of the capstan wheels 133 and 134, respectively, by interlocking with the main slide 180 for converting the operation mode.

Referring to FIGS. 6 and 7, the pinch roller driving apparatus includes the pair of guide brackets 178 and 179, the pair of pinch rollers 187 and 188 installed at each of the guide brackets 178 and 179 to selectively close-contact the respective rotation shafts 136 and 137 of the pair of capstan wheels 133 and 134, the upper protruding portion 182 integrally formed with the main slide 180 and both ends 182a and 182b of the upper portion thereof are angled, and pinch levers 183 and 184. The pinch levers 183 and 184 selectively press the guide brackets 178 and 179 to allow the pinch rollers 187 and 188 to pivot, by pivoting while selectively contacting the both ends 182a and 182b of the upper protruding portion 182, according to the position of the head slide 162 installed at the main base 110 which is configured to be capable of moving up/down.

Here, since the upper protruding portion 182 and the pinch levers 183 and 184 correspond to the above-described pinch roller driving unit of a portable audio logic deck mechanism, a detailed description on the configuration and operation thereof will be omitted.

The ejecting apparatus for a portable logic deck according to a preferred embodiment of the present invention is installed at the main base 110 of the portable logic deck mechanism described referring to FIGS. 3 through 5, enabling up or down movement of the magnetic head 160, opening/closing of the door and the AMS function.

Figure 8:
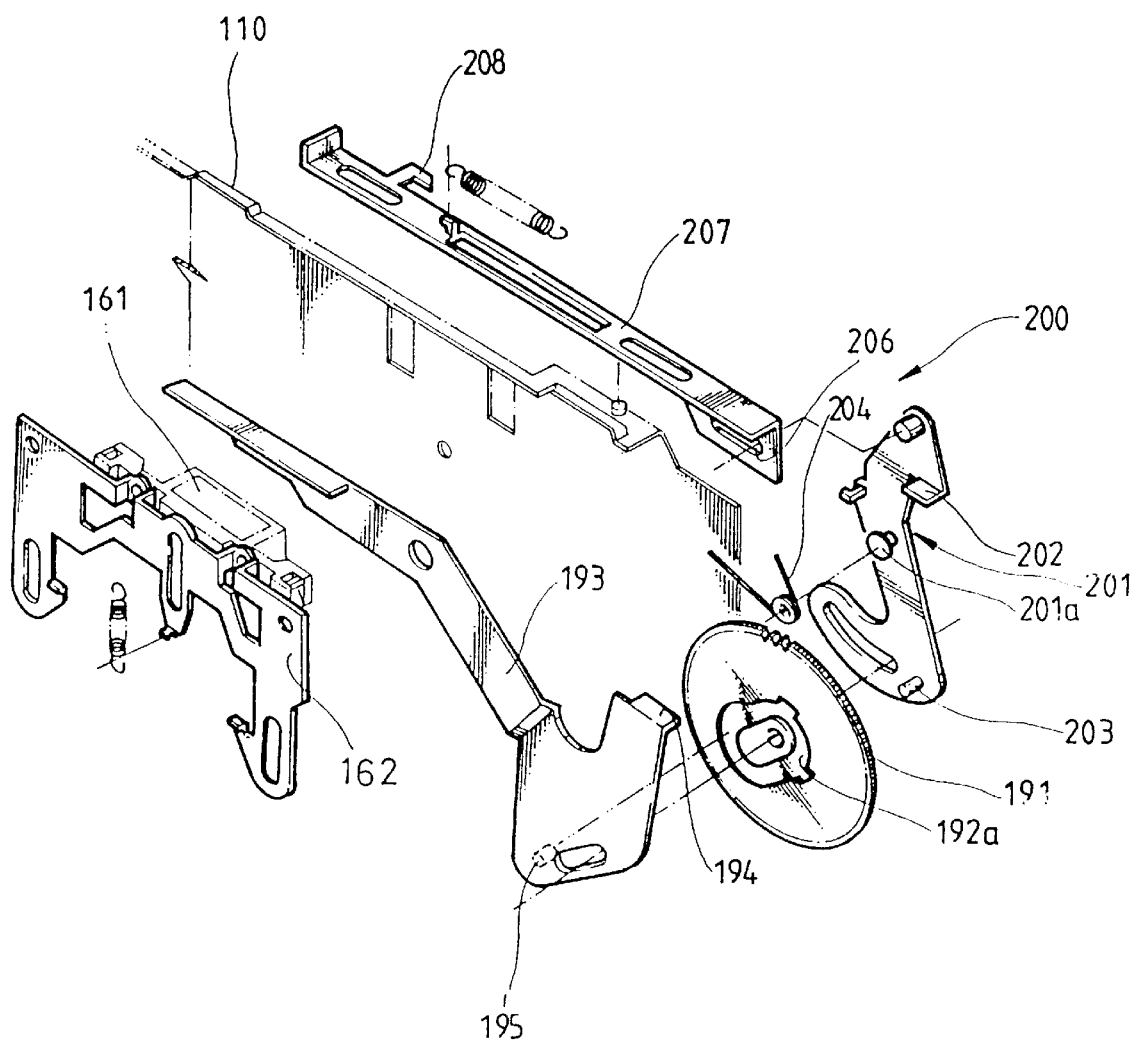
FIG. 8 is an exploded perspective view illustrating an ejecting apparatus for a portable audio logic deck according to a preferred embodiment of the present invention.
Figure 9:
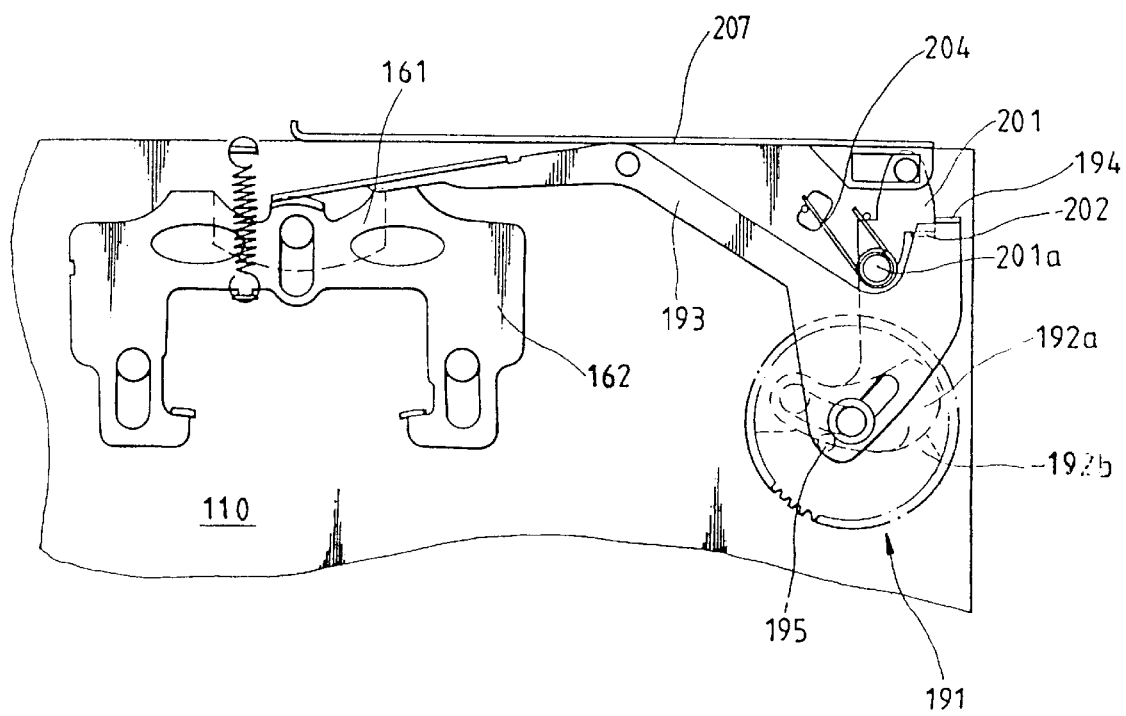
FIG. 9 is a plan view illustrating the ejecting apparatus for a portable audio logic deck in a play mode according to a preferred embodiment of the present invention.

For that purpose, as shown in FIGS. 8 and 9, the ejecting apparatus includes the opening/closing knob 207 having a lock member 208 of which one side is formed to be hooked by the door (not shown), the ejection lever 201 pivotably installed at the main base 110, the cam gear 191 facing the cam groove 192a of a predetermined shape, and the head lever 193 for moving up or down by interlocking with the cam gear 191.

Here, since the ejecting apparatus corresponds to the second mode converting unit and the ejecting unit described earlier with the embodiment of the portable audio logic deck mechanism of the present invention, the description of its details and operation is omitted.

As described above, in the portable audio logic deck mechanism according to the present invention, the magnetic head moves up or down independently from the main slide by providing two cam gears so that a load to the main slide and consumption of current can be reduced.

Also, in the pinch roller driving apparatus for a portable logic deck mechanism according to the prevent invention, the power transferred by the main slide is transferred directly to the pinch lever using the upper protruding portion integrally formed with the main slide. Thus, loss of power can be reduced.

The ejecting apparatus for a portable logic deck according to the present invention is appropriate for an audio logic deck mechanism in which the magnetic head moves up or down by not being interlocked with the main slide, and has a simplified structure since the apparatus is operated by the cam gear and two levers.

What is claimed is:

1. A portable audio logic deck mechanism comprising:

a main base;

a single driving source installed at said main base;

a power transfer unit which transmits power from said driving source;

a pair of reel tables installed at predetermined positions on said main base to accommodate a supply reel and a take-up reel of a tape;

an interlocking unit which transmits power by selecting one of said reel tables to be interlocked with said power transfer unit:

a recording/reproducing unit which records and/or reproduces information on/from the tape placed on said reel tables according to a selection mode;

a first mode converting unit which converts a rotational speed and direction of said reel tables: said first mode converting unit comprising a motive generators a first cam gear which finely pivots by said motive generator and selectively interlocks with said power transfer unit, a main slide which linearly moves interlockingly with said first cam gear, a pair of guide brackets which are pivotably installed at said main base, a pair of pinch rollers which are pivotably installed at each of said guide brackets and control the rotational speed of said tape by being selectively interlocked with rotation shafts of capstan wheels, and a pinch roller driving unit which selectively pivots said guide brackets by being interlocked with the movement of said main slide;

a second mode converting unit which moves said recording/reproducing unit up or down by interlocking with said first mode converting unit; said second mode converting unit comprising a second cam gear rotating interlockingly with said first cam gear; and a head lever of which the rotational center is installed in said main base and which moves said recording/reproducing unit up or down by being interlocked with said second cam gear; and an ejecting unit which is installed at said main base to open or close a door.

2. A portable audio logic deck mechanism as claimed in claim 5, wherein said recording/reproducing unit comprises:

a head slide installed at the main base and capable of moving up and down;

a magnetic head installed in said head slide and selectively contacting said tape placed on said reel tables; and a head elastic member which allows said head slide to receive a force in one direction.

3. A portable audio logic deck mechanism as claimed in claim 1, wherein said pinch roller driving unit comprises:

an upper protruding portion having both ends of the upper portion thereof formed at an inclined angle; and a pair of pinch levers which is pivotably installed at a predetermined position of said recording/reproducing unit and selectively presses said guide brackets to pivot said pinch rollers by pivoting while selectively contacting both ends of said upper protruding portion according to the positions of said recording/reproducing unit and said main slide.

4. A portable audio logic deck mechanism as claimed in claim 1, wherein said head lever further comprises a first stopper formed to protrude at one end thereof to selectively control operations of said ejecting unit according to a mode.

5. A portable audio logic deck mechanism as claimed in claim 4, wherein said ejecting unit comprises:

an opening/closing knob installed at said main base to be capable of sliding and having a lock member of which one side is formed to be hooked by a door; and an ejection lever pivotably installed in said main base and of which one end is coupled with said opening/closing knob, and having a second stopper which protrudes to contact said first stopper in a play mode.

6. A portable audio logic deck mechanism as claimed in claim 5, wherein said ejecting unit further comprises an elastic member which is installed between said main base and said opening/closing knob and allows said opening/closing knob to receive a force in one direction.

* * * * *